(12) United States Patent  
Wallaker et al.

(10) Patent No.: US 8,113,846 B2
(45) Date of Patent: Feb. 14, 2012

(54) DUMMY MEDICAL INSTRUMENT FOR USE IN A SIMULATOR

(75) Inventors: Daniel Mark Wallaker, Great Wakering (GB); Jeremy Roger Mills, Wickford (GB)

(73) Assignee: Keymed (Medical & Industrial Equipment) Limited, Southend-On-Sea, Essex (GB)

( * ) Notice: Subject to any disclaimer, the term of this patent is extended or adjusted under 35 U.S.C. 154(b) by 1166 days.

(21) Appl. No.: 10/596,427

(22) PCT Filed: Dec. 16, 2004

(86) PCT No.: PCT/GB2004/005310
§ 371 (c)(1),
(2), (4) Date: Jun. 15, 2007

(87) PCT Pub. No.: WO2005/059866
PCT Pub. Date: Jun. 30, 2005

(65) Prior Publication Data
US 2007/0254272 A1 Nov. 1, 2007

(30) Foreign Application Priority Data
Dec. 19, 2003 (GB) .................................. 0329521.9

(51) Int. Cl.
*G09B 23/28* (2006.01)
(52) U.S. Cl. .................... 434/272; 434/262; 434/267
(58) Field of Classification Search .................. 434/262, 434/267, 272
See application file for complete search history.

(56) References Cited

U.S. PATENT DOCUMENTS

| 5,573,492 A | * | 11/1996 | Dianna et al. | ................ | 600/117 |
| 6,929,481 B1 | * | 8/2005 | Alexander et al. | ............ | 434/262 |
| 7,208,005 B2 | * | 4/2007 | Frecker et al. | ................ | 606/205 |
| 2003/0130711 A1 | * | 7/2003 | Pearson et al. | ................ | 607/101 |

FOREIGN PATENT DOCUMENTS

| GB | 2252656 A | 8/1992 |
| GB | 2384613 A | 7/2003 |
| WO | WO02070980 A1 | 9/2002 |
| WO | WO03058583 A2 | 7/2003 |

OTHER PUBLICATIONS

International Search Report PCT/GB2004/005310.

* cited by examiner

*Primary Examiner* — Nikolai A Gishnock
(74) *Attorney, Agent, or Firm* — Luedeka, Neely & Graham, PC

(57) ABSTRACT

A dummy instrument for use in a simulator, the instrument comprising a control body (101) with user manipulatable angulation control (105), an insertion tube (102) and an umbilical (103) extending from the control body. In a real instrument corresponding to the one being simulated, at least one angulation cable would extend from the user manipulatable controls to the tip of the insertion tube such that movement of the angulation control changes the angulation of the tip. In the dummy medical instrument the angulation cable extends from the user manipulatable angulation control, and down the umbilical. The umbilical is releasably attached to a main unit (105). A motor (20,21) within the instrument at the distal end of the umbilical to applies a variable force to the cable. A position detector (30,31) within the instrument detects the angular position of the angulation control.

8 Claims, 4 Drawing Sheets

DUMMY MEDICAL INSTRUMENT FOR USE IN A SIMULATOR

The present invention relates to a dummy medical instrument for use in a simulator.

One type of simulator to which the present invention is applicable is that disclosed in GB A 2252656. This simulator simulates the operation of an endoscopic process. A dummy endoscope is insertable into a fixture which is provided with a sensor mechanism to sense the longitudinal and rotational movement of the dummy endoscope. This information is fed to a controller which generates force feedback information based on virtual model data held in the computer memory. The force feedback applied to the dummy endoscope is synchronised with a visual representation of the procedure so as to provide a realistic simulation providing a useful training tool to endoscope users.

With an instrument such as an endoscope, the tip of the endoscope is manipulated by angulation control in the form of one or more control knobs on the handle of the endoscope which are linked to cables which extend down the insertion tube of the endoscope. Turning of the control knobs produces a corresponding movement of the cable and hence the tip. An endoscope can have two control knobs one of which controls the left/right movement of the tip and the other of which controls the up/down movement of the tip.

An example of a dummy medical instrument which uses the angulation cables to transmit the force feedback to the control body is disclosed in our earlier application WO 03/058583. In this instrument, the angulation cables are directed along the umbilical of the instrument to a main unit where they are wound around motors which generate a variable force to provide force feedback.

In an operation such as a colonoscopy, the medical practitioner will often twist the control body a number of times to manipulate the endoscope along the colon. In doing this, the umbilical can become severely twisted. In order to remove the coils, the endoscopist or assistant may either reverse the control body at a suitable safe place in the colon, or unplug the umbilical and untwist it. This latter option is not possible with the arrangement disclosed in WO 03/658583 as the four wires extending from the umbilical are permanently wrapped around the force feedback motors in the main unit to which the umbilical is attached. Further, the permanent attachment of the umbilical to the main unit makes transportation and storage of the umbilical difficult.

To address this problem, we have proposed a dummy medical instrument with a connector which is detachable from the main unit by the user which contains means to apply a variable force to the cable. This is claimed in WO 04/015654. This allows an operator to simulate the process which is carried out in practice of detaching and untwisting the umbilical before plugging it back into the main unit.

However, when the umbilical is detached in this way, sensing of the position of angulation controls is no longer possible. In practice, an operator will not generally move the angulation control when the umbilical is detached as his/her attention will be focused on untwisting the umbilical, rather than continuing to manipulate the endoscope. However, it is possible for the angulation control to be manipulated at this time, and this will cause position to be lost.

According to the present invention there is provided a dummy instrument for use in a simulator, the instrument comprising a control body with user manipulatable angulation control, an insertion tube and an umbilical extending from the control body, wherein in a real instrument corresponding to the one being simulated, at least one angulation cable would extend from the user manipulatable controls to the tip of the insertion tube such that movement of the angulation control changes the angulation of the tip, and wherein in the dummy medical instrument the angulation cable extends from the user manipulatable angulation control, and down the umbilical, the umbilical being releasably attached to a main unit, a motor within the instrument at the distal end of the umbilical to apply a variable force to the cable, and a position detector within the instrument to detect the angular position of the angulation control.

Thus, the umbilical is still detachable from the main unit. However, as the motor and position detector are within the instrument, when the umbilical is disconnected, the simulation will be aware of the position of the angulation controls when the umbilical is reconnected. Also, as there is no detachable connection to the motors and sensors, there is no issue of having to re-engage with the motor and position detector when the umbilical is reconnected, nor is there any danger of slippage across this releasable connection.

The position detector may either detect the position of the angulation control directly by measuring the rotation of the angulation control. Alternatively, it may detect this indirectly measuring the position of the cable. In the latter case, the detector may be positioned at the distal end of the umbilical such that it can be packaged with the motor.

Preferably, the dummy instrument is provided with two pairs of angulation cables, each pair forming a loop around the control body, and around a respective motor at the distal end of the umbilical. Such an arrangement provides the left/right and up/down control provided in a normal endoscope. Alternatively, the dummy instrument may be an instrument such as a bronchoscope which only has a single pair of angulation cables.

With use of the instrument, the cable loops can become slack. Therefore, preferably, means are provided to retension the loop.

As the end of the umbilical with one or more motors and position sensors is intended to be removable, it should be designed such that the motor(s), in particular, are as light as possible. If the detached end of the umbilical is considered by users to be too cumbersome to manipulate, a connector at the distal end of the umbilical could be configured to provide a two-part release, allowing release to a partially released position in which the umbilical may be rotated relative to the base unit, but in which the weight of the umbilical is still supported by the base unit, and a second fully released position in which the umbilical is completely releasable from the base unit. Thus, if a user wishes only to untwist the umbilical, he can move the connector to its partially released configuration and untwist the umbilical without having to support the weight of the motors. If the instrument is to be replaced by a different instrument, the connector is fully released and a replacement instrument can be introduced.

In order to provide full sensing of the angulation position, high resolution absolute position detecting is necessary. However, an absolute high resolution position detector suitable for this task is a large component. Therefore, preferably, the position of the or each angulation cable is sensed by a combination of a low resolution absolute position detector and a higher resolution incremental encoder. Such a combination provides the necessary absolute high resolution detection without requiring a single high resolution absolute position detector.

Examples of a dummy medical instrument constructed in accordance with the present invention will now be described with reference to the accompanying drawings, in which.

The basic details of providing angulation force feedback by rerouting the angulation force feedback cables from the insertion portion of the endoscope back down the umbilical of the endoscope are described in detail in our earlier applications WO 03/058583 and GB 2383890.

Figure 1:
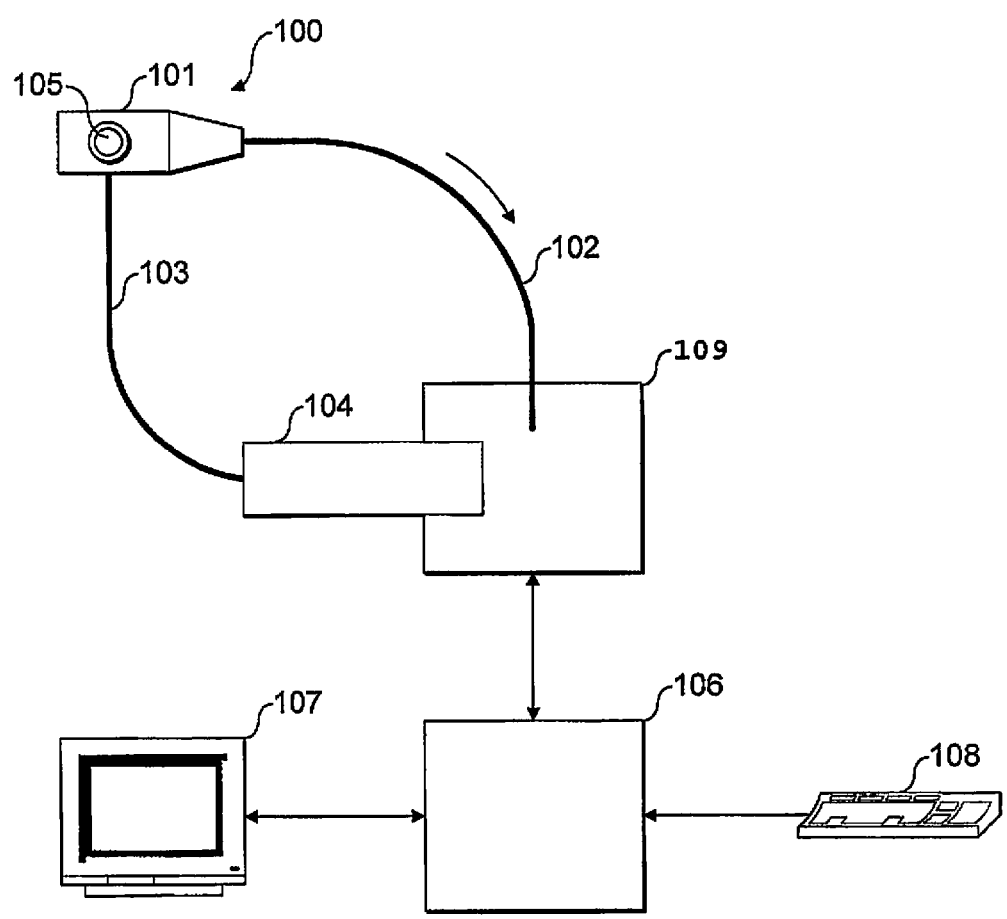
FIG. 1 is a schematic diagram of the instrument and overall simulation system.

The basic system to which the invention is applicable is shown schematically in FIG. 1. An endoscope 100 consists of a control body 101 with an insertion tube 102 and an umbilical 103 at the distal end of which is a connector 104. The control body 101 is provided with a pair of concentric angulation control wheels 105. As disclosed in WO 03/058583 a respective loop of angulation wire extends around each control wheel, and is then re-routed via a pulley system in the control body 101 through 180° back down through the umbilical 103. In the present invention, the control wires emerge at the connector 104 as described in greater detail below.

The connector 104 connects to a force feedback unit 109. The insertion tube 102 is also inserted into an orifice in the force feedback unit 109. Here, the insertion tube 102 engages with sensors (not shown) which monitor its linear and rotational position and a force feedback mechanism (not shown) to transmit linear and rotational force feedback to the insertion tube as appropriate. A suitable sensing and force feedback arrangement is disclosed in WO 03/050783.

The system is controlled by a controller 106 which interfaces with the force feedback unit 109. The controller 106 also controls the graphical simulation which is displayed on a monitor 107 and also interfaces with a keyboard 108. It will be appreciated that other user interfaces such as a mouse, or touch-sensitive screen may alternatively be used.

Four angulation cables 1,2,3,4 are grouped in pairs, namely a pair for controlling the up/down motion of the endoscope tip and a pair for controlling the left/right motion of the endoscope tip. Each pair is moved by rotation of one of the control wheels 105. In the dummy instrument, no actual movement of the tip of the instrument occurs as the cables have been rerouted. However, the corresponding movement of the cables is sensed, and this information is fed to the controller 106 which detects the 'virtual' position of the endoscope tip and calculates the displayed view and the force feedback applied to the instrument accordingly.

The connector 104 at the distal tip of the umbilical 103 where the four cables emerge is shown in the accompanying drawings.

The distal end of the umbilical 103 is shown in the drawing and the four cables 1,2,3,4 are shown emerging from the distal end of the umbilical and passing into the connector 104.

Figure 2:
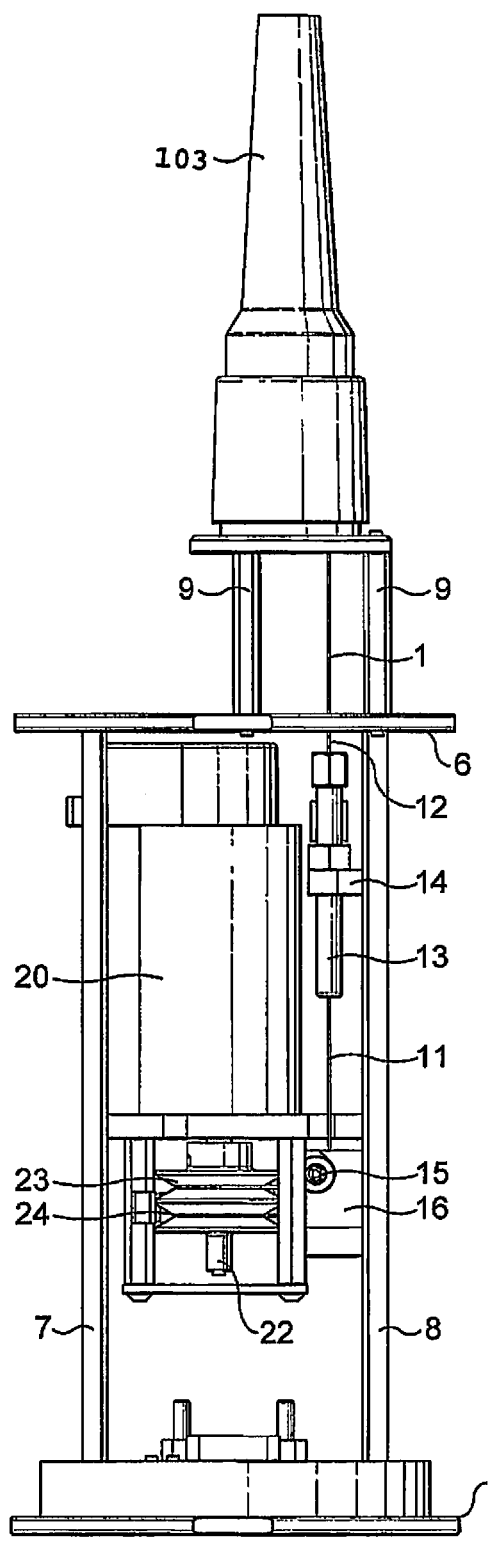
FIG. 2 is a plan view of the distal end of the umbilical and connector with the casing of the connector removed.
Figure 3:
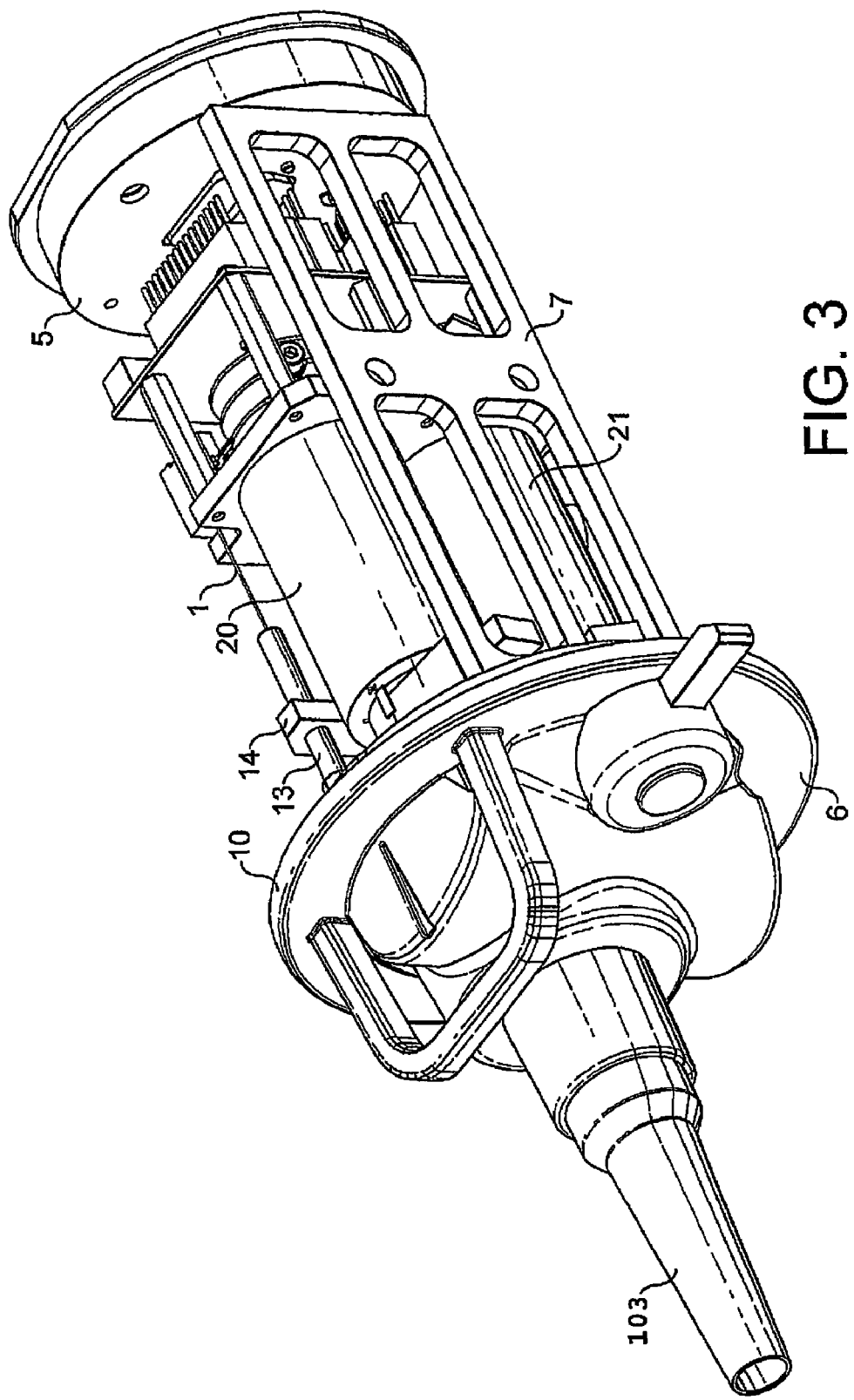
FIG. 3 is a perspective view of the arrangement of FIG. 2 from one end.
Figure 4:
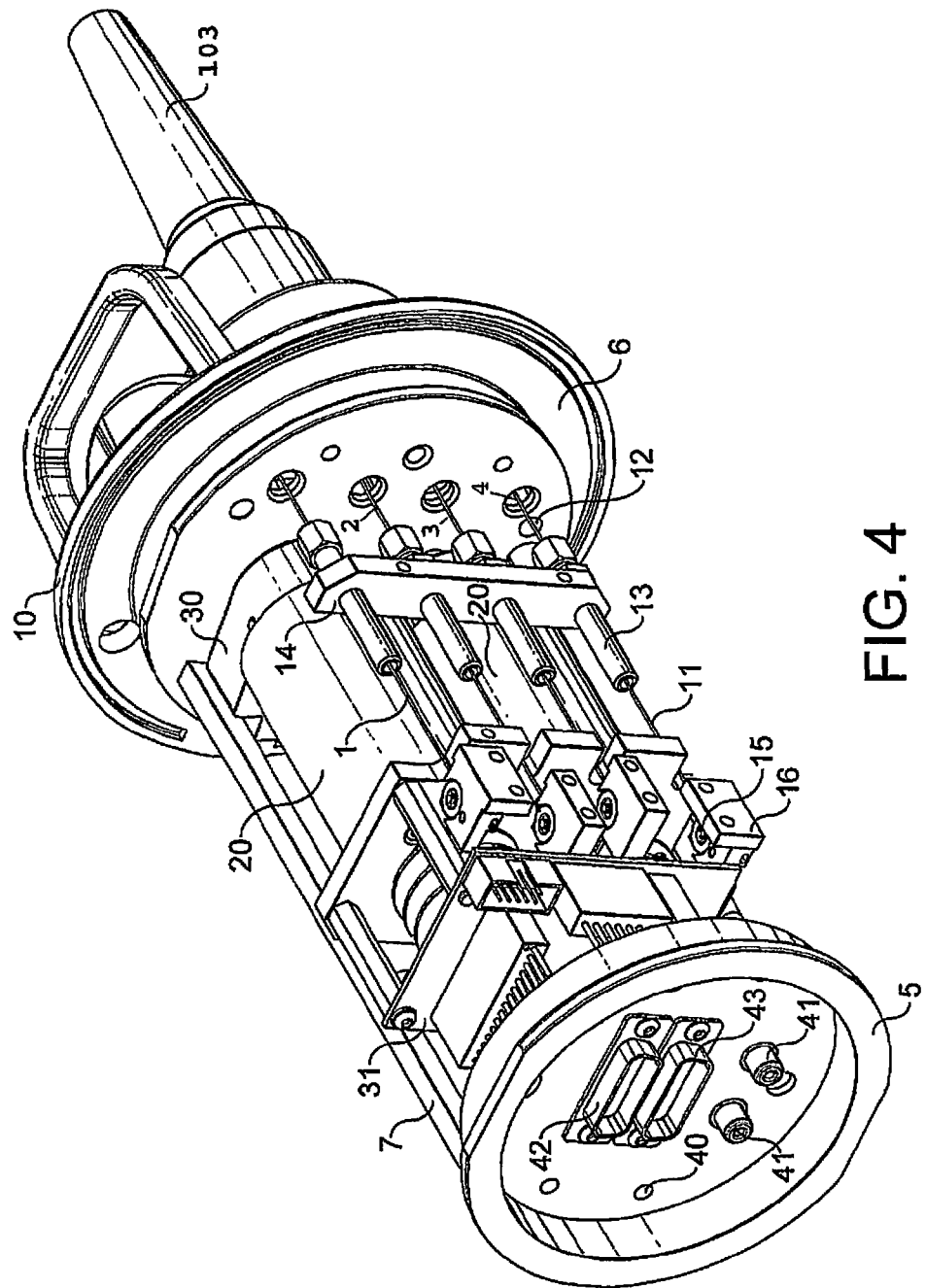
FIG. 4 is a perspective view of the arrangement of FIG. 2 from the opposite end.

The connector 104 will have a cylindrical housing which has been removed from the drawings for clarity. This is connected between two circular end plates 5,6. End plates 5,6 are further supported by a pair of support plates 7,8 but FIGS. 2 and 3 have been shown without the support plate 8 so as not to obscure the detail of the internal mechanism of the connector 104.

As best shown in FIG. 1, a number of spacers 9 external from the end of the umbilical 103 to the end plate 6. These spaces are covered by a moulded cover 10 which is not shown in FIG. 1. The purpose of these is to allow the space for the cables 1-4 to fan out to the extent shown in FIG. 3.

Each cable 1-4 consists of an inner wire 11 surrounded by a sheath 12. Each sheath 12 terminates at a bolt 13 which is screw threaded into a flange 14 in the housing. Such an arrangement allows the position of the sheath 12 to be moved with respect to the wire 11, thereby allowing tensioning of the cable. Each wire 11 extends around a small pulley 15 which is mounted in a pulley block 16 and turns each wire through approximately 90° as best shown in FIG. 1. This angle may be different for each wire.

Also mounted within the connector are a pair of force feedback motors, namely an upper force feedback motor 20 and a lower force feedback motor 21. Each motor has an output shaft 22 to which a pair of pulley wheels 23,24 are rigidly mounted.

In relation to the upper motor 20, the pulleys 23,24 are positioned such that they are aligned with the wires 11 from cables 1 and 2 respectively once these are routed around the small pulleys 15. Specifically, the wire 11 from the first cable 1 is aligned with a groove in the top surface of the pulley 23, while the wire 11 from the second cable 2 is aligned with a groove in the lower surface of the second pulley 24. The two wires are fastened to the two pulleys by respective screw clamps.

A similar arrangement is employed in respect of the lower motor 21 and the third and fourth cables 3,4. Thus, the force output from the two motors can be transmitted to the pairs of cables 1,2 and 3,4 to provide force feedback for the up/down and left/right movements of the endoscope tip respectively.

Position readings for the cable wires are provided by a combination of an incremental (relative) position detector 30 and an absolute position detector on board 31 for each motor. An absolute position detector is required as the connection is not powered when disconnected from its unit. However, a high resolution absolute position detector would be too large to fit in the space available. A combination of the absolute position detector with a high resolution incremental encoder 30 overcomes this problem.

A number of features are provided on the end plate 5 to interface with the base unit when the connector is in place. In particular, an alignment orifice 40 is arranged to cooperate with a corresponding pin on the base unit to ensure that the connector is inserted in the correct orientation. Two air ports 41 are provided. These connect to an air supply in the base unit, and tubes run from these ports along the connector and up the umbilical to the endoscope handle. One of these provides the air to the insufflation button on the handle which provides a realistic feel to this button, while the other provides a supply of air for a pneumatic force feedback device. A power input port 42 is arranged to provide a connection for power to the motors 20, 21 and a data board 42 provides a connection for data to and from the connector 104.

The invention claimed is:

1. A dummy instrument for use in a simulator, the instrument comprising: a control body with user manipulatable angulation control, an insertion tube and an umbilical having a proximal end extending from the control body, and a distal end at the opposite end, and at least one angulation cable movable by the angulation control and extending from the user manipulatable angulation control, and down within the umbilical, the umbilical being releasably attached at its distal end to a main unit, a motor within the distal end of the umbilical to apply a variable force to the cable, and a position detector within the instrument to detect the angular position of the angulation control.

2. An instrument according to claim 1, wherein the position detector measures the rotation of the control.

3. An instrument according to claim 1, wherein the position detector measures the displacement of the cable.

4. An instrument according to claim 3, wherein the position detector is located at the distal end of the umbilical.

5. An instrument according to 1, wherein the instrument is provided with two pairs of angulation cables each pair forming a loop around the control body, and around a respective motor at the distal end of the umbilical.

6. An instrument according to claim 5, wherein means are provided to retension each of the loops.

7. An instrument according to claim 1, wherein a connector at the distal end of the umbilical is configured to provide a two-part release, allowing release to a partially released position in which the umbilical may be rotated relative to the base unit, but in which the weight of the umbilical is still supported by the base unit, and a second fully released position in which the umbilical is completely releasable from the base unit.

8. An instrument according to claim 1, wherein the position of each angulation cable is sensed by a combination of a low resolution absolute position detector and a higher resolution incremental encoder.

* * * * *